United States Patent [19]
Branconnier et al.

[11] Patent Number: 5,810,903
[45] Date of Patent: Sep. 22, 1998

[54] PROCESS FOR THERMOPHILIC AEROBIC FERMENTATION OF ORGANIC WASTE

[76] Inventors: René Joseph Branconnier, 18747 - 56th Avenue, Surrey, Canada, V3A 7R2; Daniel Brian Cumming, 144 Niska Road, Guelph, Ontario, Canada, N1C 1B8; Robert Lester Jackman, 63 - 95 Burns Drive, Guelph, Ontario, Canada, N1H 6V8

[21] Appl. No.: 703,031

[22] Filed: Aug. 26, 1996

[30] Foreign Application Priority Data

Aug. 23, 1996 [CA] Canada .................................. 2184044

[51] Int. Cl.$^6$ ............................... C05F 11/08; C02F 3/00
[52] U.S. Cl. ................................ 71/9; 210/606; 210/613; 210/629
[58] Field of Search ............................. 71/8, 9; 210/606, 210/609, 610, 613, 623, 629

[56] References Cited

U.S. PATENT DOCUMENTS

| | | |
|---|---|---|
| 3,462,275 | 8/1969 | Bellamy . |
| 4,072,494 | 2/1978 | Gujer ............................................ 71/9 |
| 4,132,638 | 1/1979 | Carlsson .................................. 210/606 |
| 4,292,328 | 9/1981 | Coulthard et al. . |
| 4,512,103 | 4/1985 | Coulthard et al. . |
| 5,702,499 | 12/1997 | Timmenga .................................... 71/9 |

FOREIGN PATENT DOCUMENTS

| | | |
|---|---|---|
| 1084762 | 9/1980 | Canada . |
| 0723939 | 7/1996 | European Pat. Off. . |
| 2730532 | 1/1978 | Germany . |
| 9519329 | 7/1995 | WIPO . |

OTHER PUBLICATIONS

Updegraff, D.M., "Microbiological Aspects of Solid–Waste Composting", Dev. Indust. Microbiol. 13: 16–24.

Saito, M. et al., "Development of a microbial community on cellulose . . . ", Biol. Fertil. Soils (1990) 9: 301–305.

Tribe, H.T., "Ecology of Micro–Organisms in Soils as Observed . . . ", Symp. Soc. Gen. Microbiol. 7: 287–304 (1957).

Golueke, C.G. et al, "A Critical Evaluation of Inoculums in Composting", Applied Microbiology 2: 45–53 (1954).

Van Wyck Publications, "Bidding on Bay Street", Jul. 5, 1995, entire document.

Thermo Tech Technologies Inc., "Thermo Tech Times", 2nd Edition, Summer 1995, entire document.

Thermo Tech Technologies Inc., "Waste Not. Want Not.", Jun. 1995, entire document.

Thermo Tech Technologies Inc., Annual Report, 1994, entire document.

Thermo Tech Technologies Inc., "Thermo Tech Process – Fastest method for wet waste conversion also most effective.", date unknown, entire document.

Thermo Tech Technologies Inc., "New Alternatives to Organic Waste Disposal", date unknown, entire document.

*Primary Examiner*—Gary P. Straub
*Attorney, Agent, or Firm*—Riches,McKenzie & Herbert

[57] ABSTRACT

A thermophilic, aerobic fermentation process is disclosed for conversion of a wide variety of organic waste materials to useful end products. The fermentation process is initiated over a period of from about 2 to 6 days by application of external heat to an uninoculated, oxygenated aqueous mixture of the waste material, and thus utilizes thermophilic microorganisms naturally present in the waste material to initiate the fermentation. After initiation of an active fermentation, additional amounts of waste material are added to the fermenting mixture on a continuous or intermittent basis to maintain the fermentation in an active state. Therefore, the process can be conducted on a continuous or semi-continuous basis, requiring about 24 to 48 hours for waste to be completely converted to end product. The process is capable of being operated over a wide pH range and can ferment acidic waste materials without the need for pH adjustment. The process converts waste matter such as food waste and fecal matter into a protein enriched end product suitable for use as an animal feed, feed supplement or fertilizer, fertilizer ingredient, soil amendment or soil conditioner free of pathogens, biological contaminants and chemical contaminants such as antibiotics.

27 Claims, 1 Drawing Sheet

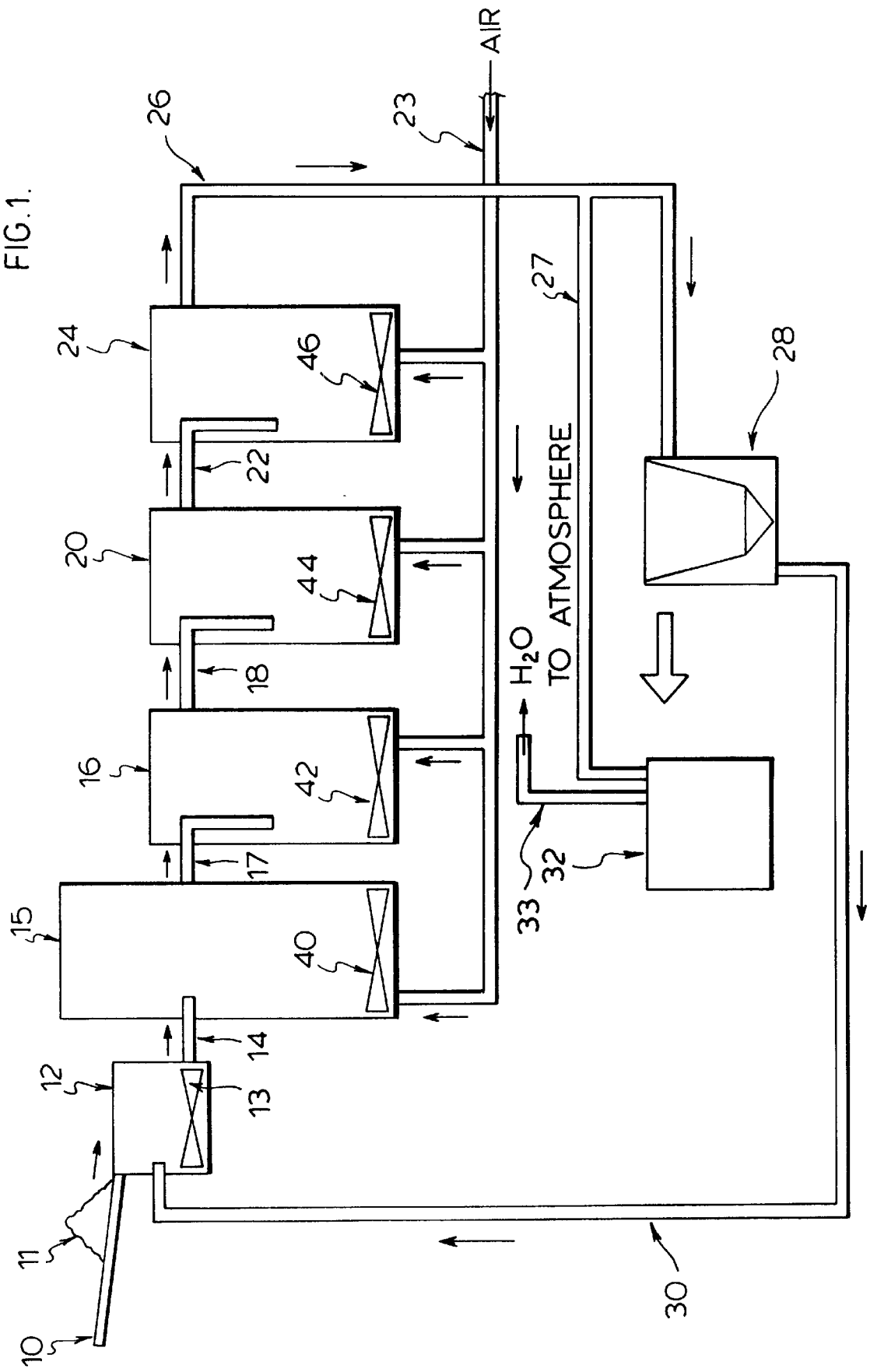

PROCESS FOR THERMOPHILIC AEROBIC FERMENTATION OF ORGANIC WASTE

FIELD OF THE INVENTION

This invention relates to a commercially viable process for converting organic waste from various sources to useful end products by a thermophilic, aerobic microbiological fermentation process, more particularly a fermentation process which is initiated without inoculation with thermophilic microorganisms and in which external heat is applied to achieve and maintain thermophilic temperatures.

BACKGROUND OF THE INVENTION

It is well known that the disposal of organic waste materials, for example animal and food wastes, is becoming increasingly difficult and expensive. As a way to avoid the difficulties in disposal of organic waste materials, fermentation processes have been developed to chemically modify these wastes into useful end products, such as animal feeds, feed supplements and fertilizers.

In general, such fermentation processes are conducted in the presence of oxygen at elevated temperatures, preferably in the range of from about 50° C. to about 80° C. Microorganisms which grow and proliferate in this temperature range and which preferably are largely responsible for fermenting the waste material are known as "thermophilic" microorganisms or "thermophiles". Aside from chemical modification of the waste material by the thermophilic microorganisms, it is generally known that the heat generated by fermentation processes conducted in this temperature range is capable of providing a "pasteurization" effect by destroying pathogens and other undesirable biological contaminants present in the waste material. This pasteurization effect is desirable since it increases the safety of the end product, whether used as a fertilizer or food stuff.

One example of a known process for thermophilic fermentation of animal waste is disclosed in U.S. Pat. No. 3,462,275, issued to W. D. Bellamy. In the Bellamy process, animal fecal matter is inoculated with thermophilically active microorganisms obtained from sources such as compost piles or hot springs, and is then heated by an external heat source to thermophilic fermentation temperatures in a thermophilic aerobic growth chamber. After fermentation of the inoculated waste by the thermophilic microorganisms, a fermented product is obtained which is separated into solid and liquid components by centrifuging and filtering. The liquid is disposed of by conventional means while the solid portion is dried and packaged for use as an animal food stuff.

One disadvantage of the Bellamy process is that inoculation of the waste material with thermophilic microorganisms may be problematic. For example, microorganisms obtained from external sources for the purpose of inoculation may not be compatible with the waste matter being fermented, thus requiring careful process control. For example, pH adjustment of the fermenting mixture to within a narrow range at which the microorganisms proliferate and/or nutrient supplementation may be required. Also, inoculation requires the addition of one or more steps to the overall process.

Therefore, inoculation of the waste material with thermophilic microorganisms is preferably avoided. However, it has generally been accepted that thermophilic microorganisms are not naturally present in waste materials in sufficient quantities to initiate or sustain thermophilic fermentation.

Another known fermentation process is described in U.S. Pat. No. 4,292,328, issued to Coulthard et al. The Coulthard patent describes a thermophilic, aerobic fermentation process for converting a wide range of organic waste materials into animal feeds, feed supplements and fertilizers. Although, like the Bellamy process, inoculation is fundamental to the Coulthard process, it is disclosed in Coulthard that microorganisms naturally present in the waste material may be used to initiate and maintain an active fermentation.

Since the waste material is at ambient temperature before initiation of the fermentation, the microorganisms naturally present in the waste material in the greatest number are those which grow and proliferate at temperatures of from about 0° C. to about 30° C. These microorganisms are referred to as "psychrophilic" microorganisms or "psychrophiles". The Coulthard process initiates the fermentation by introducing the waste material into a thermally insulated fermenter as an aqueous slurry, and vigorously agitating and oxygenating the mixture at ambient temperatures to promote the growth of aerobic, psychrophilic microorganisms.

As fermentation begins at ambient temperature, psychrophilic microorganisms metabolize substrates present in the waste material and liberate heat, thereby gradually raising the temperature of the fermenting mixture out of the ambient temperature range to slightly elevated temperatures between ambient temperatures and thermophilic temperatures. As the temperature increases, the psychrophilic microorganisms are gradually replaced by "mesophilic" microorganisms or "mesophiles" which grow and proliferate at temperatures of from about 20° to about 50° C.

Fermentation by the mesophilic microorganisms gradually raises the temperature into the thermophilic range of from about 50° to about 80° C., at which thermophilic microorganisms proliferate.

Therefore, the Coulthard fermentation process is dependent on a succession of microorganisms to slowly raise the temperature over a period of about two or more days from ambient to thermophilic temperatures in which the desired thermophilic microorganisms grow and proliferate. This succession of microorganisms involves a progressive and successive change in the profile of the microorganisms from mainly psychrophiles to mesophiles, and then to thermophiles, effected by simultaneous aeration and agitation of the fermenting waste.

It would be expected that using an external heat source to rapidly heat uninoculated waste matter to thermophilic temperatures would preclude this succession of microorganisms and would result in the thermophilic fermentation process being initiated either very slowly or not at all. Raising the temperature to the thermophilic range would permit growth primarily only of thermophiles, which as discussed above are generally considered to be present in the unfermented waste material in much smaller numbers than psychrophiles.

The inventors have found that promoting a succession of microorganisms as in the Coulthard process is disadvantageous in that the waste material is at least partially fermented by microorganisms other than thermophilic microorganisms, primarily during the initial stages of the process before the temperature has risen into the thermophilic range. Some of the microorganisms which proliferate at lower temperatures may cause contamination and/or poisoning of the waste material. Furthermore, fermentation at lower temperatures allows the continued growth and proliferation of pathogens present in the waste material.

Specifically, control over the fermentation in the Coulthard process is minimal, particularly during the initial stages. For example, the Coulthard process may not lead to establishment of thermophilic conditions at all or maintenance of a thermophilic fermentation if initiation is achieved. This is at least partially due to the fact that fermentable substrates may be completely utilized prior to establishment of thermophilic conditions. Furthermore, the fermentable substrates may be utilized by psychrophilic or mesophilic microorganisms which may preclude the growth of thermophilic microorganisms through production and liberation of toxins or poisons, such as growth inhibitors and antibiotics, in the fermentation medium.

Therefore, the disadvantage exists that no thermophilic, aerobic fermentation process is known which avoids the use of inoculation with thermophilic microorganisms and which promotes growth and proliferation only of thermophilic organisms.

Even though the Coulthard fermentation process utilizes microorganisms occurring naturally in the waste matter, it is still somewhat pH sensitive. For example, in order to ferment acidic waste materials such as wastes from fruit and vegetable processing, which typically have a pH in the range of about 3.8 to about 4.4, Coulthard teaches the addition of a pH adjusting agent to raise the pH into a more neutral range.

Therefore, the additional disadvantage exists that no aerobic, thermophilic fermentation processes are known which do not require careful monitoring of process pH and the addition of pH adjusting agents.

SUMMARY OF THE INVENTION

To overcome the disadvantages of the prior art discussed above, the present invention provides a process for thermophilic, aerobic fermentation of organic waste which is initiated by application of external heat to an oxygenated aqueous mixture of uninoculated waste matter.

The inventors have surprisingly found that a thermophilic fermentation can be initiated by application of heat to an uninoculated aqueous mixture of waste matter, thus promoting the growth and proliferation primarily only of thermophilic microorganisms in the waste matter. Although external heating of the uninoculated waste matter precludes a succession of microorganisms from being produced, the inventors have found that the thermophilic fermentation may be completely initiated in a period of from about 2 to about 6 days.

Subsequent to initiation, the present invention preferably also provides a semi-continuous or continuous process for fermentation of waste matter which is capable of fermenting a wide range of waste materials over a wide pH range. In the semi-continuous or continuous fermentation of the present invention, relatively small volumes of uninoculated waste matter is fed intermittently or continuously into an active fermentation, and fermented product is removed intermittently or continuously from the active fermentation. Preferably, the volume of the active fermentation is completely turned over once about every 24 to 48 hours.

Furthermore, because the fermentation process of the present invention is not initiated by inoculation, it utilizes thermophilic microorganisms naturally present in the waste material, which are more compatible with the waste material than microorganisms introduced by inoculation.

The inventors have also surprisingly found that the process of the present invention is relatively insensitive to the pH of the waste material and operates over a wide pH range. In fact, the inventors have found that almost all types of food, animal and lignocellulosic wastes may be fermented by the process of the present invention without the addition of pH adjusting agents.

In particular, the inventors have found that the present process does not require the neutralization of acidic waste matter, such as fruit and vegetable processing waste, thus making it adaptable to fermentation of a wide variety of waste materials without the need to carefully monitor and adjust pH.

By reason of the improvements of the process of the present invention over previously known processes, the process of the present invention may be used on a commercial basis to quickly and efficiently convert a wide range of waste matter into a useable end product, such as animal feed, animal feed supplements, fertilizers, fertilizer ingredients, soil conditioners or soil amendments.

Preferably, when used as a commercial process, the process of the present invention is operated on a continuous or semi-continuous basis. The inventors have found that operation of the process on a continuous or semi-continuous basis provides improved control over the fermentation. Specifically, operation on a continuous or semi-continuous basis ensures that a thermophilic fermentation will be maintained by supplementation of the active fermentation with a continuous or semi-continuous supply of fresh substrate to preferably maintain the fermentation in a steady state. Maintaining the thermophilic fermentation in a steady state ensures that there will be minimal competition for fermentable substrates by other competing microorganisms, thereby reducing the chance that the fermentation will be suppressed or inhibited by competing microorganisms.

It is one object of the present invention to provide initiation of a process for conversion of waste matter to a useful end product by thermophilic, aerobic fermentation of the waste matter wherein external heat is applied to uninoculated waste matter, such that the process is initiated by thermophilic microorganisms naturally occurring in the waste matter.

It is another object of the present invention to provide a process for conversion of waste matter to a useful end product by thermophilic, aerobic fermentation of waste matter, the process being initiated by application of heat to uninoculated waste matter, such that the process is initiated by thermophilic microorganisms naturally occurring in the waste matter.

It is yet another object of the present invention to provide continuous and semi-continuous processes for conversion of waste matter to a useful end product by thermophilic aerobic fermentation of the waste matter.

It is yet another object of the present invention to provide a process for conversion of waste matter to a useful end product by thermophilic aerobic fermentation of the waste matter, the process being operated at acidic pH.

It is yet another object of the present invention to provide a process for conversion of waste matter to a useful end product by thermophilic aerobic fermentation of the waste matter, wherein the process is capable of destroying chemical contaminants present in the waste material.

In one aspect, the present invention provides a process for conversion of organic waste matter to an end product by thermophilic, aerobic fermentation of the waste matter by thermophilic microorganisms naturally occurring in the waste matter, the process being initiated by steps of: forming an aqueous mixture of the waste matter; heating the mixture, with heat from an external heat source, to a temperature suitable for growth and proliferation of the thermophilic microorganisms; and oxygenating the mixture at the temperature by continuously introducing oxygen into the mixture to maintain an oxygen concentration in the mixture sufficient for growth and proliferation of the thermophilic microorganisms.

Preferably, the waste matter is selected from the group comprising animal fecal matter, bakery product waste, waste derived from fruits and vegetables, food wastes derived from animals, tannery waste, leaves, weeds, trees, shrubs, and wood refuse.

Preferably, the end product is selected from the group comprising animal feeds, animal feed supplements, and fertilizers, fertilizer ingredients, soil conditioners and soil amendments.

Preferably, the waste matter is mechanically macerated to a particle size of from less than about 1 mm to about 5 mm prior to or during the step of forming the aqueous mixture, and the aqueous mixture contains from about 5 percent to about 20 percent total solids by weight.

Preferably, the process is initiated over a period of from about 2 to about 6 days at a temperature of from about 55° to about 80° C. and an oxygen concentration maintained at about 0.2 ppm or higher.

Preferably, the initiation is complete when the fermentation reaches a steady state at which a rate of the fermentation is substantially constant and a portion of the waste matter has been converted to the end product.

In another aspect, the present invention provides a process for conversion of organic waste matter to an end product by thermophilic, aerobic fermentation of the waste matter by thermophilic microorganisms naturally occurring in the waste matter, the process comprising: (a) initiation of the fermentation by steps of: (i) heating an aqueous mixture containing the waste matter in a fermentation vessel, with heat from an external heat source, to a temperature suitable for growth and proliferation of the thermophilic microorganisms; (ii) oxygenating the aqueous mixture at the temperature by continuously introducing oxygen into the mixture to maintain an oxygen concentration in the mixture sufficient for growth and proliferation of the thermophilic microorganisms, the initiation being continued until the fermentation reaches a steady state at which a rate of the fermentation is substantially constant and a portion of the waste matter in the aqueous mixture has been converted to the end product; (b) continuing the heating and the oxygenating of the aqueous mixture; (c) adding to the fermentation vessel additional quantities of an aqueous mixture of the waste matter; and (d) removing from the fermentation vessel quantities of the aqueous mixture containing the end product, such that growth and proliferation of the thermophilic microorganisms is maintained in the fermentation vessel during steps (b), (c) and (d).

Preferably, the steady state of the fermentation is maintained during steps (b), (c) and (d), at a temperature maintained in the range of from about 55° C. to about 80° C., and an oxygen concentration is maintained in a range of from about 1 ppm to about 5 ppm during steps (b), (c) and (d).

Preferably, step (c) comprises intermittently adding to the fermentation vessel additional quantities of an aqueous mixture of the waste matter, and step (d) comprises intermittently removing from the fermentation vessel quantities of the aqueous mixture containing the end product.

Preferably, the fermentation vessel comprises a primary fermentation vessel which is connected to a secondary fermentation vessel, and step (d) comprises transferring quantities of the aqueous mixture containing both the waste matter and the end product to the secondary fermentation vessel, and substantially completing the fermentation in the secondary fermentation vessel, the process additionally comprising: (e) heating the aqueous mixture in the secondary fermentation vessel, with heat from an external heat source, to maintain a temperature therein suitable for growth and proliferation of the thermophilic microorganisms; (f) oxygenating the aqueous mixture in the secondary fermentation vessel by continuously introducing oxygen into the mixture to maintain an oxygen concentration therein sufficient for growth and proliferation of the thermophilic microorganisms; and (g) removing from the secondary fermentation vessel quantities of the aqueous mixture containing the end product and containing substantially no unfermented waste material, wherein the fermentation in the secondary fermentation vessel is maintained at a steady state at which a rate of the fermentation is substantially constant.

Preferably, step (c) comprises continuously adding to the primary fermentation vessel additional quantities of an aqueous mixture of the waste matter, and step (d) comprises continuously transferring the aqueous mixture from the primary fermentation vessel to the secondary fermentation vessel.

Preferably, step (g) comprises continuously removing from the secondary fermentation vessel quantities of the aqueous mixture containing the end product and containing substantially no unfermented waste material.

Preferably, the retention time of the aqueous mixture in the primary and secondary fermentation vessels from step (b) to (g) is sufficient that the aqueous mixture removed from the secondary fermentation vessel in step (g) contains no unfermented waste matter and no biological contaminants present in the waste material prior to the fermentation, and wherein the biological contaminants are one or more members selected from the group comprising pathogens, insect eggs, larvae, worms, and viruses.

Preferably, the waste material prior to fermentation contains chemical contaminants, and wherein a retention time of the aqueous mixture in the primary and secondary fermentation vessels from step (b) to (g) is sufficient that the aqueous mixture removed from the secondary fermentation vessel in step (g) contains no unfermented waste matter and none of the chemical contaminants, and wherein the chemical contaminants are selected from the group comprising herbicides, pesticides and pharmaceuticals selected from one or more members of the group comprising chlortetracycline, sulfamethazine and penicillin.

Preferably, the pH in the primary and secondary fermentation vessels is in a range of from about 3.8 to about 4.4, and wherein the waste matter comprises food waste.

BRIEF DESCRIPTION OF THE DRAWINGS

Further aspects and advantages of the present invention will become apparent from the following description, taken together with the accompanying drawings, in which:

FIG. 1 is a schematic representation of a preferred continuous fermentation process according to the present invention.

DETAILED DESCRIPTION OF THE PREFERRED EMBODIMENTS

The preferred process of the present invention preferably comprises initiation of an active fermentation followed by continuous or semi-continuous processing of wastes, and is now described below with reference to FIG. 1.

The process of the present invention may be used to ferment a wide variety of organic materials, which are normally considered wastes and treated as disposal problems. Typical waste materials include tannery waste, municipal or yard waste, food waste, animal waste and sludges from biological processes. Animal waste includes fecal matter or manure produced as a byproduct of an animal's digestion of food, for example manure from cattle, swine, sheep, horses, mink, chicken or human fecal matter which may be in the form of sewage sludge (~5% solids), dewatered sewage sludge (~25–30% solids) or septage.

Food waste includes bakery product waste, all fruit and vegetable processing waste, for example potato and tomato processing wastes, all fruit and vegetable trim and peeling wastes, and food wastes derived from animals such as meats and meat trimmings, cheese whey, fish processing wastes, and slaughterhouse waste such as blood. Food wastes may be obtained from a wide variety of sources, including retail and wholesale grocery operations, restaurants, institutions, food processors/preparers, and "wet" household garbage.

Municipal or yard waste includes leaves and weeds, as well as materials containing lignocellulosic complexes, for example woody plants such as trees, shrubs and wood refuse derived therefrom. Lignocellulosic materials may also be obtained as by-products of wood processing industries. Tannery wastes include hides, bones, cartilage and animal trimmings.

Furthermore, the process of the present invention is capable of either fermenting mixtures of various types of waste materials or "pure" waste materials comprising only one type of waste.

Therefore, the process of the present invention is capable of fermenting a wide range of waste materials of plant or animal origins. In general, any organic substances comprised of protein, simple and/or complex carbohydrates and lipids are fermentable according to the process of the present invention, including those disclosed in the Coulthard patent.

The first step in the process is the formation of an aqueous mixture of the organic waste matter. Because the fermentation of the waste matter occurs at its surface, it is preferred to maximize the surface area of the waste material available to the microorganisms by mechanically macerating the waste material prior to commencement of the fermentation.

Since different types of waste matter differ in water content, it may be necessary to add water to the waste matter prior to commencement of the fermentation process to reduce the viscosity of the aqueous mixture, thereby avoiding use of large amounts of energy to agitate the mixture during fermentation. The reduced viscosity also serves to increase the dissolution of oxygen in the fermentation medium. Preferably, the aqueous mixture of waste matter contains from about 5% to about 20% total solids by weight, more preferably from about 12% to about 18% by weight.

In the preferred process of the present invention shown in FIG. 1, a hydropulper 12 having a blade 13 is used to macerate the waste matter. The capacity of hydropulper 12 may preferably be about 12,000 to 16,000 litres. If necessary, water may be added to the waste matter in the hydropulper 12. However, it is to be appreciated that water may also be added to the waste matter during the fermentation process. Preferably, the waste matter is reduced to a particle size as small as possible, generally from less than about 1 mm to about 5 mm.

The aqueous mixture of hydropulped, macerated waste matter is preferably subjected to fermentation shortly after being formed. However, the aqueous mixture may be stored prior to fermentation, preferably not longer than about 24 hours. Preferably, the aqueous mixture is oxygenated during storage by aeration and agitation, thereby avoiding substantial anaerobic fermentation during storage.

Preferably, the aqueous mixture is pumped from hydropulper 12 through conduit 14 to a holding vessel 15, where the aqueous mixture may be stored with constant agitation by mixing blade 40 and aeration through air supply 23, and without application of heat. The holding vessel 15 is merely a reservoir of "raw", unfermented waste matter, from which the aqueous mixture of waste matter is drawn intermittently or continuously, and pumped through conduit 17 to a fermentation apparatus. Different waste materials may also be blended in the holding vessel. It is to be appreciated that more than one holding vessel 15 may be provided. The capacity of holding vessel 15 may preferably be about 50,000 to 55,000 litres.

The fermentation apparatus comprises at least one fermenter, and preferably comprises at least two fermenters connected in series. In a more preferred embodiment shown in FIG. 1, the fermentation apparatus comprises primary fermenter 16, having a mixing blade 42 and connected through conduit 18 to a secondary fermenter 20, which has a mixing blade 44 and is connected through conduit 22 to a tertiary fermenter, or wet product storage tank, 24 which has a mixing blade 46. Fermenters 16, 20 and 24 are preferably highly insulated and similar to the fermenters described in the Coulthard patent, each fermenter preferably having a capacity of about 30,000 litres. However, for purposes of temperature control and air quality management, the fermenters 16, 20 and 24 are preferably covered to substantially completely enclose the aqueous mixtures fermenting therein. Furthermore, each of the fermenters 16, 20 and 24 is provided with a source of external heat (not shown).

Initiation of the preferred fermentation process of the present invention is now described with reference to FIG. 1.

Initiation of the fermentation process of the present invention may be viewed as a batch process. Firstly, a quantity of the aqueous mixture of waste material is pumped through conduit 17 from holding vessel 15 to primary fermenter 16. Preferably, the quantity of aqueous mixture transferred from holding vessel 15 is sufficient to substantially fill primary fermenter 16. More preferably, both primary fermenter 16 and secondary fermenter 20 are completely filled with the aqueous mixture, with secondary fermenter 20 preferably being filled through primary fermenter 16 by conduit 18. The preferred initiation process will be described as having both primary fermenter 16 and secondary fermenter 20 filled with the aqueous mixture of waste matter.

The aqueous mixture pumped from holding vessel 15 to primary fermenter 16 and secondary fermenter 20 is preferably at ambient temperature, typically from about 10° to about 30° C.

Once inside primary fermenter 16 and secondary fermenter 20, external heat is applied to the aqueous mixture, preferably rapidly increasing its temperature from ambient temperature to a thermophilic temperature. The term "thermophilic temperature" as used herein means a temperature sufficient to promote growth and proliferation of thermophilic microorganisms. Thermophilic temperatures typically range from about 50° C. to about 85° C. The thermophilic temperature at which the process is initiated, and at which the fermentation is carried out, is at least partially dependent on the substrate and the desired characteristics of the end product.

The term "thermophilic microorganism" means any microorganism which is capable of growing and proliferating at above-defined thermophilic temperatures. Therefore, the term "thermophilic microorganism" as used herein includes thermophilic microorganisms and facultative mesophilic microorganisms, that is a mesophilic microorganism which can adapt its metabolism to grow and proliferate at thermophilic temperatures.

The term "external heat" as used herein means heat generated by a source other than the fermentation process, which is exothermic. For example, external heat may be generated by a heating coil located either inside or outside fermenters 16 and 20.

In addition to being heated, the aqueous mixture of waste matter is also oxygenated, preferably by vigorous agitation by the mixing blades 42 and 44 and aeration within fermenters 16 and 20 provided by air supply 23. This ensures that the aqueous mixture is supplied with sufficient oxygen to encourage the proliferation of aerobic, thermophilic microorganisms and to prevent the proliferation of anaerobic microorganisms. The inventors have found that oxygen demand is greatest during the initial start-up of the process, and dissolved oxygen concentrations on the order of about 0.2 ppm are typically observed. Once the process is initiated, oxygen demand drops and dissolved oxygen concentration is typically observed to rise above about 1 ppm.

Although injection of air into the fermenters 16 and 20 is the preferred form of oxygenation, it is to be appreciated that air enriched with oxygen or oxygen in any other form, including pure or substantially pure oxygen, may be used to aerate the aqueous mixture of waste matter.

The inventors have also found that the maintenance of a sufficiently high dissolved oxygen concentration requires high shear rates within the fermenter 16 effective to disperse air bubbles throughout the aqueous mixture, but not in excess of shear rates at which microbial cells are damaged or destroyed.

Once the aqueous mixture reaches thermophilic temperatures and is oxygenated in the fermenters 16 and 20, a time of from about 2 to about 6 days is typically required for thermophilic fermentation to be achieved. Preferably, the initiation is continued until the fermentation reaches a steady state at which the rate of fermentation is substantially constant and the waste matter in fermenters 16 and 20 has been partially converted to the end product. Most preferably, the steady state is the maximum rate at which the fermentation will proceed at any given temperature and oxygen concentration.

It is to be emphasized that the thermophilic fermentation is initiated without the need for inoculation, utilizing only thermophilic and facultative mesophilic microorganisms which are naturally present in the waste materials.

As discussed above, rapid heating of the aqueous mixture to thermophilic temperatures precludes the microbial succession disclosed in the Coulthard patent, and permits the proliferation only of thermophilic and facultative mesophilic microorganisms in the aqueous mixture. This has the effect of reducing competition for waste material among the microorganisms, consequently reducing the chance of contamination and/or poisoning by opportunistic microorganisms and/or pathogens that might proliferate at lower temperatures.

Once an active fermentation has been initiated by the above initiation process, continuous or semi-continuous processing of waste material according to the present invention may preferably begin. However, it is to be understood that the initiation process of the present invention may be used on its own as a batch fermentation process having distinct advantages over the above-discussed prior art processes.

As in the initiation of the process, the aqueous mixtures in the fermenters 16 and 20 are heated by an external heat source and oxygenated to promote and sustain growth and proliferation of thermophilic and facultative microorganisms. The temperature is preferably maintained within the thermophilic ranges disclosed above. The oxygenation is preferably the same as that described above with the exception that the inventors have found that dissolved oxygen concentrations of from about 1 ppm to about 5 ppm are sufficient to maintain an active fermentation in fermenters 16 and 20.

Once an active thermophilic fermentation is initiated, it is preferred that steady state fermentation conditions, and more preferably optimum fermentation conditions, be maintained within fermenters 16 and 20. Therefore, a small amount of fresh aqueous mixture of waste matter at ambient temperature is pumped from holding vessel 15 into primary fermenter 16. This provides additional fermentation substrates in the form of fresh waste matter to maintain a steady state, active fermentation in primary fermenter 16.

Since both primary and secondary fermenters 16 and 20 are preferably maintained in a full condition and are connected in series, adding fresh aqueous mixture to primary fermenter 16 preferably results in the displacement of a corresponding volume of aqueous end product from secondary fermenter 20. Furthermore, a steady state fermentation is preferably also maintained in secondary fermenter 20 by discharge thereto of partially fermented aqueous mixture from primary fermenter 16.

In a preferred continuous process of the present invention, fresh aqueous mixture of waste matter is continuously supplied to primary fermenter 16, preferably at a rate of from about 20 to about 50 litres per minute. Consequently, the aqueous mixture of end product is preferably continuously discharged from secondary fermenter 20 at substantially the same rate. In a continuous process, the provision of secondary fermenter 20 ensures that substantially no unfermented waste matter may pass through the fermentation apparatus.

In a semi-continuous process, fresh aqueous mixture of waste matter is intermittently supplied to primary fermenter 16, preferably at a constant and average rate of from about 20 to about 50 litres per minute. These intermittent additions preferably occur at a set flow rate for about 5 to about 15 minutes every one half hour. Preferably, the aqueous mixture of end product is intermittently discharged from secondary fermenter 20 at substantially the same rate. It is to be understood that a semi-continuous fermentation process could be conducted without secondary fermenter 20. However, secondary fermenter 20 is preferably provided to improve the efficiency of the process.

In the process of the present invention, it is preferred that substantially the entire fermentation occurs in the primary and secondary fermenters 16 and 20. The fermentation time, defined as the time required for volume of the active fermentation medium to be turned over, or the time required for the aqueous mixture to pass through the fermenters 16 and 20, is preferably from about 24 to about 48 hours.

Typically, in an apparatus as shown in FIG. 1 wherein the waste matter is completely or substantially completely fermented in primary and secondary fermenters 16 and 20, the degree of fermentation of material passing from primary fermenter 16 to secondary fermenter 20 is typically about 50% complete. However, it is to be appreciated that the degree of fermentation in the primary fermenter 16 is dependent both on the processing time and the number of fermenters connected in series.

A fermentation time of at least about 24 hours ensures the waste matter has a residence time in fermenters 16 and 20 sufficient to completely destroy pathogenic organisms and other undesirable biological contaminants present in the waste matter prior to fermentation. Typical pathogens include bacteria such as salmonella and coliform bacteria, and other biological contaminants include insect eggs, larvae, worms and viruses.

Given that the minimum time-temperature conditions for complete destruction of the above contaminants is about 10 minutes at 65° C., a fermentation time of about 24 hours is more than sufficient to ensure that contaminants are destroyed completely and that the end product is completely safe. Although it may be possible to provide a completely fermented product with a fermentation time of less than about 24 hours, it is preferred that the fermentation time not be shorter than about 24 hours to ensure the complete safety of the end product.

Also to ensure the safety of the end product, the process of the present invention is preferably operated in the upper end of the above-mentioned thermophilic temperature range. Preferred operating temperatures for the process of the present invention, including initiation, are above about 55° C. and no higher than about 80° C., more preferably at least about 65° C., and most preferably within the range of from about 65° C. to about 75° C.

It is to be appreciated that destruction of contaminants is dependent on both temperature and time of fermentation. Therefore, minimum time-temperature conditions may be achieved with longer fermentation times at a relatively low temperature, or short fermentation times at a relatively high temperature. However, in the process of the present invention, it is preferred to use higher temperatures as discussed above to achieve complete destruction of contaminants in a relatively short time.

The inventors have surprisingly found that the thermophilic fermentation process of the present invention is also capable of destroying a wide range of chemical contaminants which may be present in residual amounts in certain types of waste matter. Such chemical contaminants include a wide range of organic compounds, such as pharmaceuticals, pesticides, herbicides, and other organic chemicals present in waste matter.

Pharmaceuticals include antibiotics for veterinary and/or human use. In particular, antibiotics are commonly added to animal feeds and can be found in the manure or muscle tissues of farm animals which may comprise raw waste matter to be fermented in the process of the present invention. The inventors have confirmed, in challenge tests conducted with waste matter contaminated with selected agricultural antibiotics, complete destruction of these antibiotics by the process of the present invention.

In a particular challenge test conducted by the inventors, 110 g each of chlortetracycline and sulfamethazine, and 55 g of penicillin, commonly used as veterinary antibiotics, were added to an active fermentation at 70° C. This level of antibiotics is comparable to that which may be present in a finished animal feed in a concentration of 220 g per tonne.

Samples were taken from the fermentation for evaluation of antibiotic content using standard methods before addition, after 30 minutes, and at 8, 12, 24, 32, 48, 56 and 72 hours. Antibiotic was detected only in the sample collected after 30 minutes, at an equivalent concentration of 16.4 g per tonne. Therefore, more than 95% of the antibiotics were destroyed within the first 30 minutes of the test, and the balance within the first 8 hours.

It is believed that the destruction of chemical contaminants in the fermentation process of the present invention may be caused by thermal destruction or through metabolization of the chemical contaminants by thermophilic microorganisms, or a combination of both. Due to the length of the fermentation process, i.e. 24 to 48 hours, it would be expected that the process of the present invention would be capable of thermal destruction of heat sensitive chemical contaminants as well as contaminants normally considered to be relatively heat resistant.

In the example of penicillin, it is understood that an extracellularly produced enzyme is ultimately responsible for penicillin destruction. Therefore, it is possible that even compounds which are highly heat resistant may be destroyed by the process of the present invention through metabolization by thermophilic microorganisms.

Although the destruction of antibiotics has been specifically described, it is to be appreciated that the process of the present invention is not restricted to destruction of antibiotics, and is capable of destroying a wide range of chemical contaminants which may be present in waste materials.

One surprising advantage of the process of the present invention is its adaptability to a wide pH range, ranging from about 3.5 to about 9.0. This is to be contrasted with the pH range disclosed in the Coulthard patent of between about 5.0 and about 8.5, with a most preferred pH on the order of from 5.9 to 7.5. In the Coulthard process, a pH adjusting agent is added to acidic waste materials to raise their pH to an acceptable level, approaching neutral. The inventors of the present process have found that addition of a pH adjusting agent to acidic food wastes only raises the pH temporarily and that addition of the pH adjusting agent must be continued throughout the fermentation process to maintain the elevated pH.

Furthermore, the inventors have found that operation of the process at the acidic pH of many food wastes, i.e. from about 3.5 to about 4.5, more typically 3.8 to 4.4, is not only possible but is also preferred, without the addition of any pH adjusting agent. In fact, operation of the process at an acidic pH enhances the thermal destruction of contaminants, thereby increasing the safety of the end product. When the process is applied to acidic wastes, it is believed that low pH is maintained in the process by encouraging the growth only of acidophilic thermophiles. These microorganisms themselves are more effective at destruction of many contaminants and readily produce organic acids that maintain a low pH and thereby preclude the growth of microorganisms which are otherwise active at higher pH.

From secondary fermenter 20, the substantially completely fermented aqueous mixture is intermittently or continuously discharged through conduit 22 to wet product storage tank 24. As in fermenters 16 and 20, the aqueous mixture in product storage tank 24 is preferably vigorously agitated by mixing blade 46 and aerated by air supply at a thermophilic temperature, as in fermenters 16 and 20. Therefore, wet product storage tank 24 is also referred to herein as "tertiary fermenter 24". However, it is to be appreciated that the aqueous mixture entering tank 24 has been completely or substantially completely fermented in fermenters 16 and 20.

Therefore, any small amounts of unfermented waste matter remaining in the product mixture will be fermented in product storage tank 24. However, it is to be appreciated that all or substantially all of the waste matter in the aqueous mixture discharged from secondary fermenter 20 has been fermented. Therefore, the primary function of product storage tank 24 is that of a surge tank, or storage tank, for accumulation of the fermented aqueous mixture prior to further processing, such as drying.

Typically, wet product is collected until tank 24 is filled to about 80% of its capacity, after which the wet product is pumped from tank 24.

In an alternative process not shown in FIG. 1, wet product storage tank 24 is eliminated and the wet end product comprising the aqueous mixture of fermented waste matter discharged from secondary fermenter 20 is used without further processing. It is also possible to use the wet product from tank 24 without further processing. The inventors have found that such wet products may for example be directly fed to animals or used as liquid fertilizers, soil conditioners or soil amendments.

Furthermore, it is possible to operate the process on a semi-continuous basis using only one fermenter. However, it is preferred to provide at least a primary and a secondary fermenter to ensure the safety of the end product. Further, the process may be operated with more than three fermenters to further ensure the complete destruction of contaminants in the end product.

In the preferred process shown in FIG. 1, the aqueous mixture of fermented waste matter is stored in fermenter 24 until it may be subjected to drying. Most preferably, the aqueous mixture of fermented waste matter is pumped from tertiary fermenter 24 through conduit 26 to centrifuge 28 where the water content of the fermented product is reduced to obtain a wet product comprising about 35% by weight solids. It is to be appreciated that the initial removal of water may be accomplished by other means, such as decanting and filtering.

It is to be appreciated that initial removal of water, for example by centrifuging or filtering, may not be necessary or desirable and, as shown in FIG. 1, the wet product from tank 24 may be directly pumped through conduit 27 to a dryer 32. Initial water removal is not desirable, for example, when the wet product contains a high content of water soluble and/or miscible solids which would remain in the liquid fraction, but are otherwise recoverable.

The water removed from the aqueous mixture of fermented waste matter by centrifuge 28 is preferably recirculated to hydropulper 12 through conduit 30 to be slurried with waste matter being macerated in hydropulper 12. Recirculation of the liquid fraction to be slurried with fresh waste matter is a convenient way to avoid discharge of water containing solids into the environment and allow full recovery of solids from the liquid fraction.

The wet product obtained after centrifuging is typically in the form of a wet cake and may either be used directly as an end product or subjected to further drying. As shown in FIG. 1, the wet product is transferred to a dryer 32, for example by an auger, where it is preferably dried to a water content of from less than about 10 to about 15% by weight. The water vapour from the dryer 32 is preferably exhausted to the environment, as through vent 33, or used as a source of heat energy in the process. The use of a dryer 32 allows full recovery of solids from the wet product.

It is to be appreciated that many types of drying systems are available which can dry wet products having a variety of forms. For example dryers are available which can dry liquid slurries, as obtained from secondary fermenter 20 or storage tank 24, or dewatered cake as obtained from centrifuge 28. However, as discussed above, drying is not an essential step of the process of the present invention.

The dried product obtained from dryer 32 is typically a granular, powdery or somewhat fibrous solid. Although the dried end product may be used in the form in which it is removed from dryer 32, it may preferably be shaped into any convenient form, such as pellets, which may for example be used as animal feed, animal feed supplement, fertilizer, soil conditioner or soil amendment.

In overview, the fermentation process converts organic waste matter into an end product comprising biomass derived from the cells of thermophilic microorganisms such as bacteria, yeast and/or fungi, as well as unfermented proteins, lipids, carbohydrates, and breakdown products thereof arising from fermentation, and water. The product may also contain some amount of carbon dioxide which would however be largely liberated through aeration during the fermentation process. The end product has a significantly higher protein content and nutritional value than the unfermented waste matter and is therefore of value as an animal feed, animal feed component or ingredient, or as an organic fertilizer, fertilizer component, soil amendment or soil conditioner. The specific end use may be at least partially dependent on the type of waste matter being fermented. For example, it is preferred that the end product obtained by fermentation of fecal matter be used as a soil amendment, soil conditioner or organic fertilizer, rather than as an animal feed or feed component. However, it is to be appreciated that end products derived from fecal matter may be suitable for use as an animal feed or feed component.

One of the benefits of using aerobic fermentation is its oxidizing effect, which both destroys odorous compounds and promotes biological pathways that preclude the formation of compounds typical of anaerobic fermentations. Therefore, the process of the present invention is naturally less odorous than an anaerobic fermentation process.

Further, the entire apparatus used in the process of the present invention is preferably contained in a single plant building which is equipped to treat all air released into the surrounding environment, thereby minimizing unpleasant odours escaping the plant. In order to accomplish this, the plant building is preferably under a negative pressure throughout to prevent the unintentional escape of air, and all air and water vapour exhausted from the plant must preferably pass through a thermal oxidizer or other scrubbing device to destroy any odour-producing compounds.

Furthermore, steps are preferably also taken to control odours within the plant, to protect plant workers. When waste materials are delivered to the plant building, they are dumped onto a tipping floor 10 inside the plant. Air from the tipping floor 10, as well as from the fermenters 16, 20 and 24, is preferably prevented from mingling with general plant air to prevent plant workers from being exposed to unpleasant odours.

Although preferred capacities of hydropulper 12, holding vessel 15 and fermenters 16, 20 and 24 have been disclosed herein, it is to be appreciated that these capacities may be varied without departing from the process of the present invention.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein. Furthermore, it is intended that the invention cover all alternate embodiments as may be within the scope of the following claims.

We claim:

1. In a process for conversion of organic waste matter to an end product by thermophilic, aerobic fermentation of said waste matter by thermophilic microorganisms naturally occurring in said waste matter, the improvement comprising initiation of said process by steps consisting essentially of:

forming an aqueous mixture of said waste matter, wherein said waste matter is untreated by inoculation or by addition thereto of enzymes;

heating said mixture of said untreated waste matter, with heat essentially solely from an external heat source, over a time period of less than about 48 hours, from a first, ambient temperature to a second temperature suitable for growth and proliferation of said thermophilic microorganisms, such that there is significantly less growth and proliferation of psychrophilic and mesophilic microorganisms in said mixture of waste matter than if said mixture was not heated by said external heat source; and oxygenating said mixture of said untreated waste matter at said second temperature by continuously introducing oxygen into said mixture to maintain an oxygen concentration in said mixture sufficient for growth and proliferation of said thermophilic microorganisms, wherein said process is initiated by growth and proliferation of said thermophilic microorganisms naturally occurring in said untreated waste matter.

2. The process of claim 1, wherein said waste matter is selected from the group comprising animal fecal matter, bakery product waste, waste derived from fruits and vegetables, food wastes derived from animals, tannery waste, leaves, weeds, trees, shrubs, and wood refuse.

3. The process of claim 1, wherein said waste matter is mechanically macerated to a particle size of from less than about 1 mm to about 5 mm prior to or during said step of forming said aqueous mixture, and said aqueous mixture contains from about 5 percent to about 20 percent total solids by weight.

4. The process of claim 3, wherein said aqueous mixture of said untreated waste matter contains from greater than 15 percent to about 20 percent total solids by weight.

5. The process of claim 1, wherein said process is initiated over a period of from about 2 to about 6 days.

6. The process of claim 1, wherein said initiation is complete when said fermentation reaches a steady state at which a rate of said fermentation is substantially constant and a portion of said waste matter has been converted to said end product.

7. The process of claim 1, wherein said second temperature is from about 55° to about 80° C.

8. The process of claim 1, wherein during initiation said oxygen concentration is maintained at about 0.2 ppm or higher.

9. The process of claim 1 wherein, during said process, said aqueous mixture is maintained at a pH suitable for operation of the process without addition to said mixture of a pH adjusting agent.

10. In a process for conversion of organic waste matter to an end product by thermophilic, aerobic fermentation of said waste matter by thermophilic microorganisms naturally occurring in said waste matter, said process comprising:

a. initiation of said fermentation by steps consisting essentially of:

i. heating an aqueous mixture containing said waste matter in a fermentation vessel, to a temperature suitable for growth and proliferation of said thermophilic microorganisms, wherein said waste matter is untreated by inoculation or by addition thereto of enzymes;

ii. oxygenating said aqueous mixture containing said untreated waste matter at said temperature by continuously introducing oxygen into said mixture to maintain an oxygen concentration in said mixture sufficient for growth and proliferation of said thermophilic microorganisms, said initiation being continued until said fermentation reaches a steady state at which a rate of said fermentation is substantially constant and a portion of said waste matter in said aqueous mixture has been converted to said end product, wherein said process is initiated by growth and proliferation of said thermophilic microorganisms naturally occurring in said untreated waste matter;

b. continuing said heating and said oxygenating of said aqueous mixture;

c. adding to said fermentation vessel additional quantities of an aqueous mixture of said untreated waste matter; and d. removing from said fermentation vessel quantities of said aqueous mixture containing said end product, such that growth and proliferation of said thermophilic microorganisms is maintained in said fermentation vessel during steps (b), (c) and (d);

the improvement wherein said heating of said aqueous mixture is carried out with heat essentially solely from an external heat source, over a time period of less than about 48 hours, from ambient temperature to said temperature suitable for growth and proliferation of said thermophilic microorganisms, such that there is significantly less growth and proliferation of psychrophilic and mesophilic microorganisms in said mixture of waste matter than if said mixture was not heated by said external heat source.

11. The process of claim 10, wherein said steady state of said fermentation is maintained during steps (b), (c) and (d).

12. The process of claim 10, wherein said temperature suitable for growth and proliferation of said thermophilic microorganisms in said fermentation vessel is maintained in the range of from about 55° C. to about 80° C.

13. The process of claim 10, wherein said oxygen concentration is maintained in a range of from about 1 ppm to about 5 ppm during steps (b), (c) and (d).

14. The process of claim 10, wherein step (c) comprises intermittently adding to said fermentation vessel additional quantities of an aqueous mixture of said untreated waste matter, and step (d) comprises intermittently removing from said fermentation vessel quantities of said aqueous mixture containing said end product.

15. The process of claim 10, wherein said waste matter is selected from the group comprising animal fecal matter, bakery product waste, waste derived from fruits and vegetables, food wastes derived from animals, tannery waste, leaves, weeds, trees, shrubs, and wood refuse.

16. The process of claim 10, wherein said end product is selected from the group comprising animal feeds, animal feed supplements, and fertilizers, fertilizer ingredients, soil conditioners and soil amendments.

17. The process of claim 10, wherein said fermentation vessel comprises a primary fermentation vessel which is connected to a secondary fermentation vessel, and step (d) comprises transferring quantities of said aqueous mixture containing both said waste matter and said end product to said secondary fermentation vessel, and substantially completing said fermentation in said secondary fermentation vessel, said process additionally comprising:

(e) heating said aqueous mixture in said secondary fermentation vessel, with heat from an external heat source, to maintain a temperature therein suitable for growth and proliferation of said thermophilic microorganisms;

(f) oxygenating said aqueous mixture in said secondary fermentation vessel by continuously introducing oxygen into said mixture to maintain an oxygen concentration therein sufficient for growth and proliferation of said thermophilic microorganisms; and (g) removing from said secondary fermentation vessel quantities of said aqueous mixture containing said end product and containing substantially no unfermented waste matter, wherein said fermentation in said secondary fermentation vessel is maintained at a steady state at which a rate of said fermentation is substantially constant.

18. The process of claim 17, wherein step (c) comprises continuously adding to said primary fermentation vessel additional quantities of an aqueous mixture of said untreated waste matter, and step (d) comprises continuously transferring said aqueous mixture from said primary fermentation vessel to said secondary fermentation vessel.

19. The process of claim 17, wherein step (g) comprises continuously removing from said secondary fermentation vessel quantities of said aqueous mixture containing said end product and containing substantially none of said unfermented waste matter.

20. The process of claim 17, wherein a retention time of said aqueous mixture in said primary and secondary fermentation vessels from step (b) to (g) is sufficient that said aqueous mixture removed from the secondary fermentation vessel in step (g) contains none of said unfermented waste matter and no biological contaminants present in said untreated waste material prior to said fermentation, and wherein said biological contaminants are one or more members selected from the group comprising pathogens, insect eggs, larvae, worms, and viruses.

21. The process of claim 17, wherein said untreated waste material prior to fermentation contains chemical contaminants, and wherein a retention time of said aqueous mixture in said primary and secondary fermentation vessels from step (b) to (g) is sufficient that said aqueous mixture removed from the secondary fermentation vessel in step (g) contains none of said unfermented waste matter and none of said chemical contaminants, and wherein said chemical contaminants are selected from the group comprising herbicides, pesticides and pharmaceuticals selected from one or more members of the group comprising chlortetracycline, sulfamethazine and penicillin.

22. The process of claim 17, wherein a pH in the primary and secondary fermentation vessels is in a range of from about 3.8 to about 4.4, and wherein said waste matter comprises food waste.

23. The process of claim 10, wherein said aqueous mixture of said untreated waste matter contains from about 5 percent to about 20 percent total solids by weight.

24. The process of claim 23, wherein said aqueous mixture of said untreated waste matter contains from greater than 15 percent to about 20 percent total solids by weight.

25. The process of claim 24, wherein said pH is from about 3.5 to about 9.0.

26. The process of claim 25, wherein said pH is from about 3.5 to about 9.0.

27. The process of claim 10 wherein, during said process, said aqueous mixture is maintained at a pH suitable for operation of the process without addition to said mixture of a pH adjusting agent.

* * * * *

UNITED STATES PATENT AND TRADEMARK OFFICE
CERTIFICATE OF CORRECTION

PATENT NO. : 5,810,903
DATED : September 22, 1998
INVENTOR(S) : Rene Joseph Branconnier, et al.

It is certified that error appears in the above-identified patent and that said Letters Patent is hereby corrected as shown below:

Claim 20 at column 18, line 2, to replace "material" by --matter--;

Claim 21 at column 18, line 7, to replace "material" by --matter--;

in claim 25 at column 18, line 28, to replace "24" by --9--;

in claim 26 at column 18, line 30, to replace "25" by --27--.

Signed and Sealed this

Twenty-ninth Day of June, 1999

*Attest:*

Q. TODD DICKINSON

*Attesting Officer*     *Acting Commissioner of Patents and Trademarks*